US009845113B2

(12) United States Patent
Sawai et al.

(10) Patent No.: US 9,845,113 B2
(45) Date of Patent: Dec. 19, 2017

(54) VIBRATION DAMPING DEVICE FOR VEHICLE BODY

(71) Applicant: YAMAHA HATSUDOKI KABUSHIKI KAISHA, Iwata-shi, Shizuoka (JP)

(72) Inventors: Seiji Sawai, Shizuoka (JP); Yutaka Yamazaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/903,902

(22) PCT Filed: Jul. 11, 2014

(86) PCT No.: PCT/JP2014/068559
§ 371 (c)(1),
(2) Date: Jan. 8, 2016

(87) PCT Pub. No.: WO2015/005472
PCT Pub. Date: Jan. 15, 2015

(65) Prior Publication Data
US 2016/0152276 A1 Jun. 2, 2016

(30) Foreign Application Priority Data

Jul. 11, 2013 (JP) ................................. 2013-145173

(51) Int. Cl.
*F16F 9/26* (2006.01)
*B62D 24/04* (2006.01)
(Continued)

(52) U.S. Cl.
CPC ................ *B62D 24/04* (2013.01); *F16F 9/26* (2013.01); *F16F 13/007* (2013.01); *F16F 9/06* (2013.01); *F16F 9/16* (2013.01); *F16F 9/56* (2013.01)

(58) Field of Classification Search
CPC .... F16F 9/26; F16F 13/007; F16F 9/06; F16F 9/16; F16F 9/56; B62D 24/04
(Continued)

(56) References Cited

U.S. PATENT DOCUMENTS 5,560,456 A * 10/1996 Koch .................... E05C 17/305
188/300
6,837,343 B1 * 1/2005 Bugaj .................. B60G 21/073
188/304

(Continued)

FOREIGN PATENT DOCUMENTS

DE      42 12 079 A1    10/1993
JP        63-26440 A     2/1988
(Continued)

OTHER PUBLICATIONS

Official Communication issued in International Patent Application No. PCT/JP2014/068559, dated Sep. 2, 2014.

*Primary Examiner* — Thomas W Irvin
(74) *Attorney, Agent, or Firm* — Keating and Bennett, LLP

(57) ABSTRACT

A first hydraulic damper includes one end portion attached to a first attachment position of a vehicle body. A second hydraulic damper includes one end portion coupled to the other end portion of the first hydraulic damper via a linking member, and the other end portion attached to a second attachment position of the vehicle body. Each of the first and second hydraulic dampers includes a hydraulic cylinder, a piston, a piston rod, a free piston, a compression coil spring, first and second working oil passages to cause first and second oil chambers to communicate with each other, and working oil passage throttles. The first hydraulic damper, second hydraulic damper, and the linking member are coupled in the longitudinal direction. One of the hydraulic cylinder and piston rod is attached to the vehicle body, and the other is coupled to the linking rod.

8 Claims, 11 Drawing Sheets

(51) Int. Cl.
*F16F 13/00* (2006.01)
*F16F 9/56* (2006.01)
*F16F 9/06* (2006.01)
*F16F 9/16* (2006.01)

(58) Field of Classification Search
USPC .................................... 188/304, 312, 313
See application file for complete search history.

(56) References Cited

U.S. PATENT DOCUMENTS

| | | | |
|---|---|---|---|
| 7,478,708 B2* | 1/2009 | Bugaj | B60G 21/073 |
| | | | 188/304 |
| 7,673,904 B2* | 3/2010 | Harada | B62D 21/15 |
| | | | 280/782 |
| 2002/0056969 A1 | 5/2002 | Sawai et al. | |
| 2005/0034942 A1 | 2/2005 | Bugaj | |
| 2009/0079232 A1 | 3/2009 | Harada et al. | |
| 2009/0084643 A1* | 4/2009 | Bugaj | B60G 21/073 |
| | | | 188/266.2 |

FOREIGN PATENT DOCUMENTS

| | | | |
|---|---|---|---|
| JP | 2002-533624 A | 10/2002 | |
| JP | 2007-203896 A | 8/2007 | |
| JP | 4627389 A | 2/2011 | |
| WO | 2006/090586 A1 | 8/2006 | |

* cited by examiner

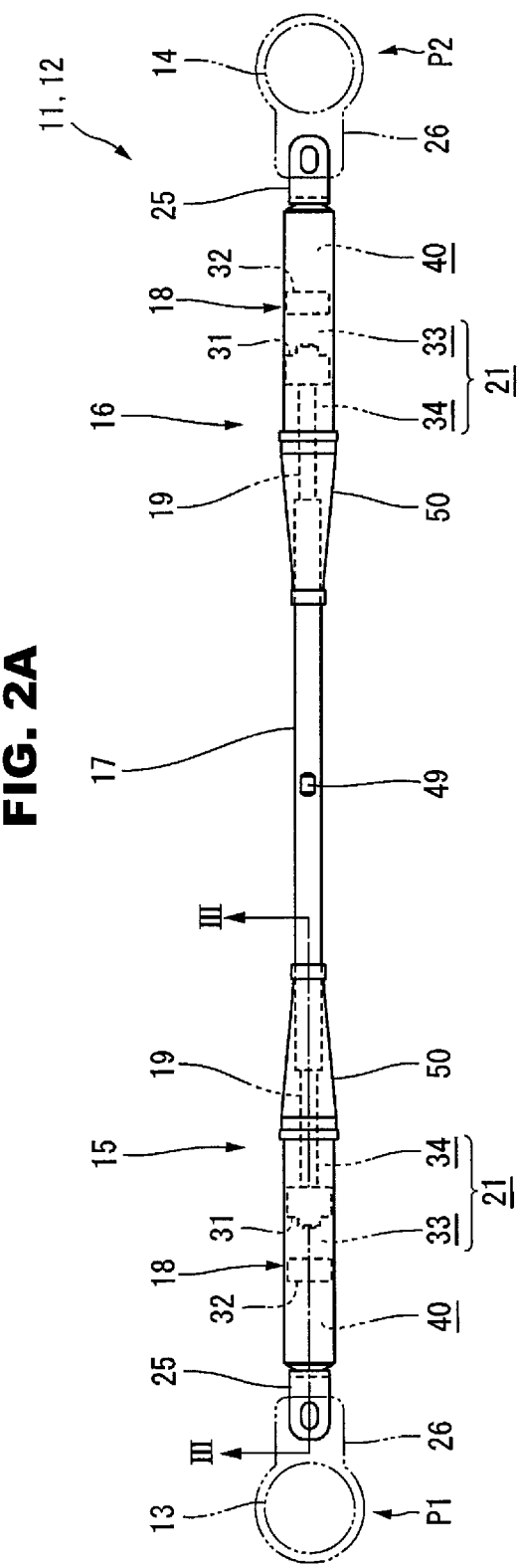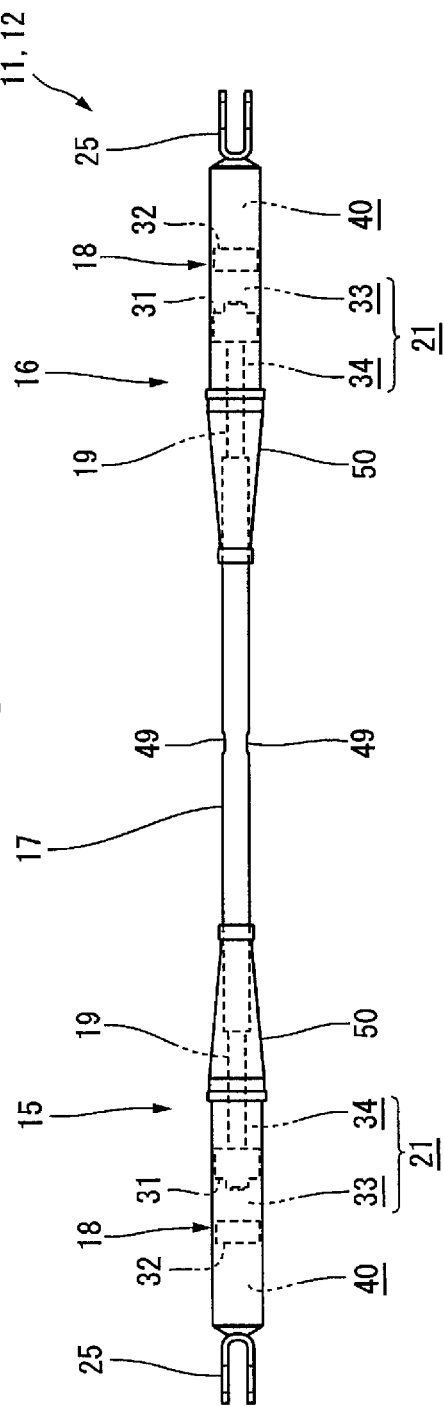

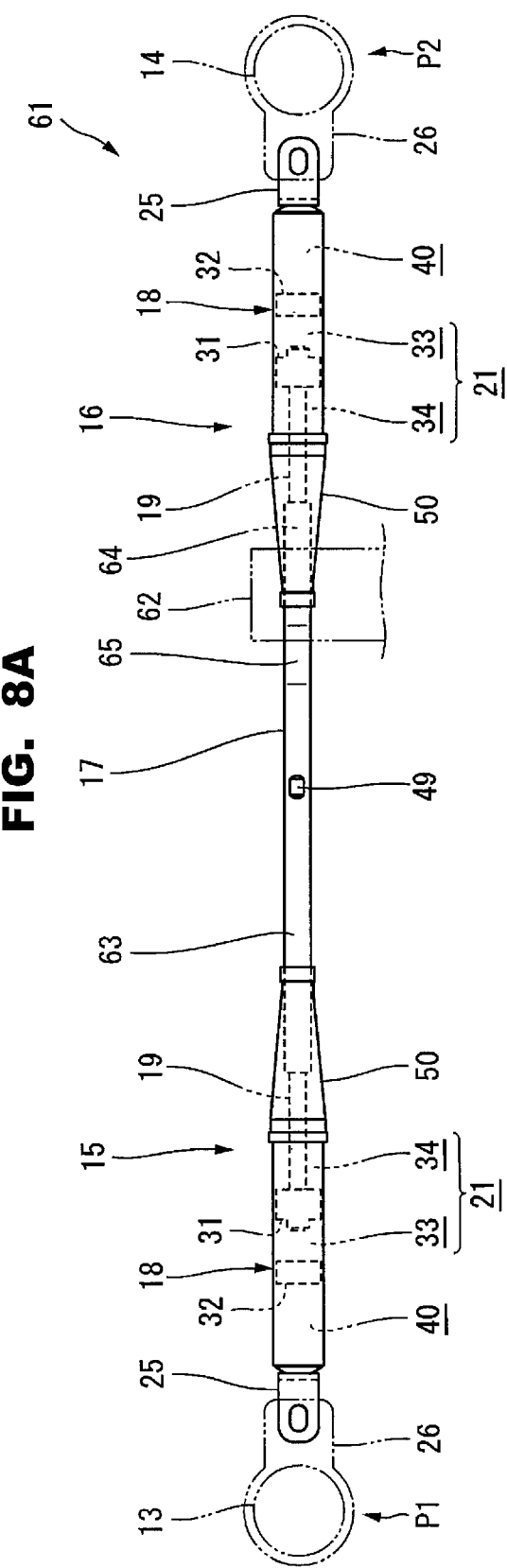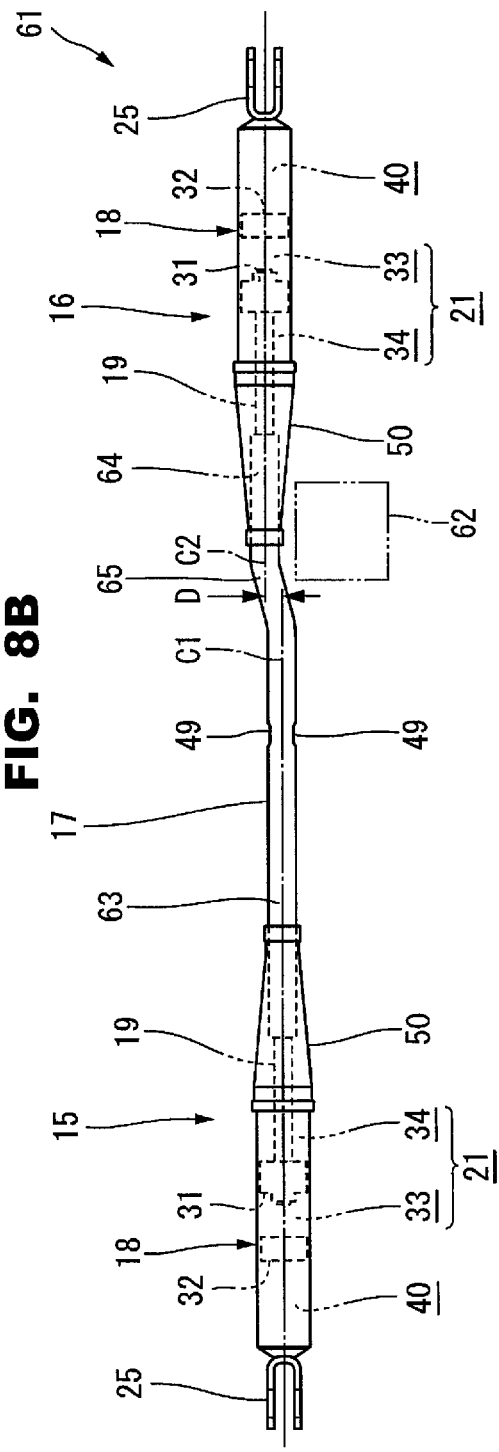

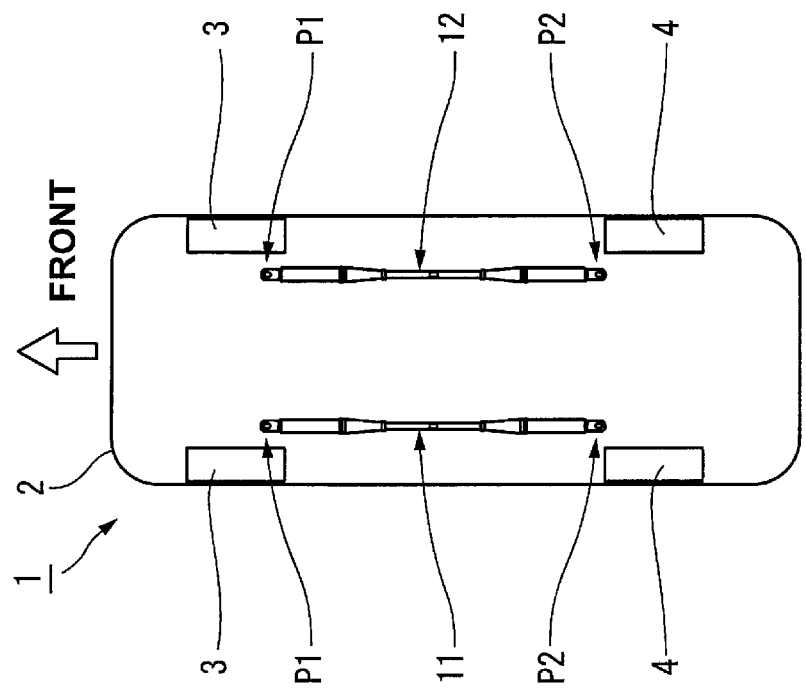
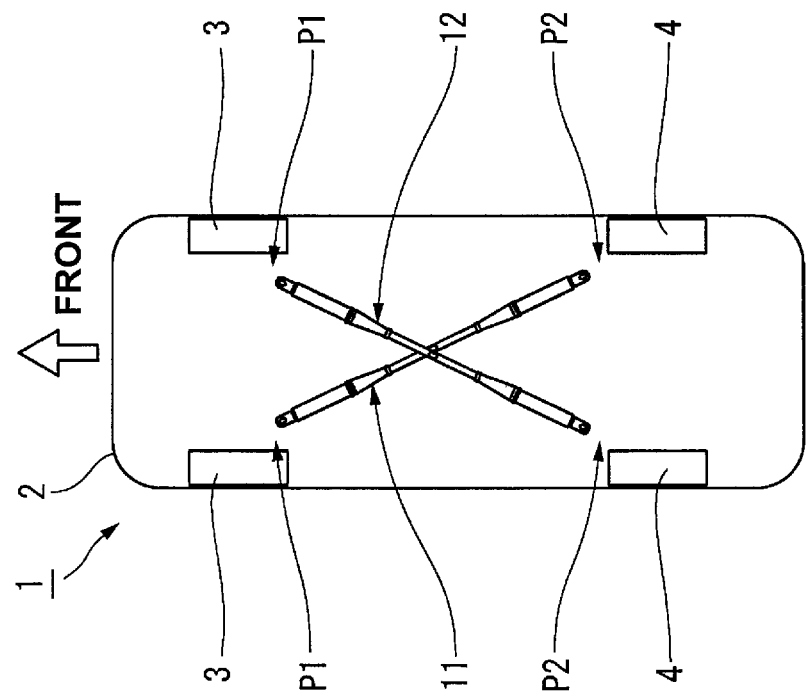

VIBRATION DAMPING DEVICE FOR VEHICLE BODY

BACKGROUND OF THE INVENTION

1. Field of the Invention

The present invention relates to a vibration damping device for a vehicle body which improves the riding comfort by damping vibrations in the vehicle body.

2. Description of the Related Art

The body of a vehicle elastically deforms slightly when an external force is applied during running of the vehicle, and this elastic deformation generates micro-vibrations of about a few ten μm to 1 to 2 mm. An external force which causes this elastic deformation is applied to the vehicle body from, e.g., a wheel running over a projection or a recess in the road surface or from the engine.

Conventionally, a vibration damping device is sometimes attached to a vehicle body in order to damp a vehicle vibration of this kind. An example of the conventional vibration damping device for a vehicle body is a hydraulic device described in Japanese Patent No. 4627389.

The hydraulic vibration damping device for a vehicle body disclosed in Japanese Patent No. 4627389 includes a hydraulic cylinder unit to generate a damping force, and a linking rod unit connected to a piston rod projecting from the hydraulic cylinder unit. The hydraulic cylinder unit includes a hydraulic cylinder, a piston, and free piston movably fitted in the hydraulic cylinder, and a piston rod which is coupled to the piston.

The piston divides an internal working oil chamber of the hydraulic cylinder into two oil chambers. The piston includes a working oil passage to cause the two oil chambers to communicate with each other, and a damping force generating check valve to open and close the working oil passage. The piston rod projects outside the hydraulic cylinder through one oil chamber.

The free piston partitions the hydraulic cylinder into a gas chamber filled with a high-pressure gas and the working oil chamber.

The hydraulic cylinder portion itself is directly fixed to one end portion of a vehicle body in the lateral or longitudinal direction. On the other hand, the piston is fixed to the other end portion of the vehicle body in the lateral or longitudinal direction via the piston rod and linking rod.

In this conventional vibration damping device for a vehicle body, the piston and hydraulic cylinder move relative to each other due to the vibrations in the vehicle body, and the working oil passes through the check valve of the piston, thus generating a damping force.

A vehicle such as a passenger car or other automobile which runs as it is driven by a driver has been required to further improve the riding comfort. However, the conventional vibration damping device for a vehicle body disclosed in Japanese Patent No. 4627389 does not satisfactorily improve the riding comfort of a vehicle for the following two reasons.

The first reason is that the hydraulic cylinder is directly fixed to one end portion of a vehicle body in the lateral or longitudinal direction as described above, so the length of the transmission path of a vibration to be transmitted to the hydraulic cylinder is different from that of the transmission path of a vibration to be transmitted to the piston. That is, the damping force generated by the hydraulic cylinder unit directly acts on a vehicle body on the hydraulic cylinder side. On the other hand, the damping force acts on a vehicle body on the piston side via a long non-rigid body defined by the piston rod and linking rod. This non-rigid body includes a spring component and elastically deforms. That is, the damping force reduced by the intervention of this non-rigid body acts on the piston-side vehicle body. Therefore, the vibration damping effect in one end portion of the vehicle body is different from that in the other end portion of the vehicle body, and this makes it difficult to further improve the riding comfort of the vehicle.

The second reason is that, if the check valve does not open because the moving velocity of the piston is significantly low, the working oil flows through a so-called leak portion such as a seat portion of the check valve or a sliding portion of the piston. The working oil has a viscous resistance. That is, in this case, a damping force which is large compared to the moving velocity of the piston is generated due to the viscous resistance of the working oil passing through the leak portion. Since this interferes with the relative movement of the piston and hydraulic cylinder, no vibration is damped, and the riding comfort of the vehicle degrades. The case in which the piston moving velocity is significantly low is, e.g., the initial stage of a piston operation or when a vehicle body moderately vibrates to such an extent that a passenger cannot feel it.

SUMMARY OF THE INVENTION

Preferred embodiments of the present invention provide a vibration damping device for a vehicle body that further improves the riding comfort of a vehicle.

A vibration damping device for a vehicle body according to a preferred embodiment of the present invention includes a first hydraulic damper including a first end portion attached to a first attachment position of a vehicle body; and a second hydraulic damper coupled to a second end portion of the first hydraulic damper via a linking member, an end portion of the second hydraulic damper, which is opposite to the linking member, being attached to a second attachment position of the vehicle body; wherein each of the first hydraulic damper and the second hydraulic damper includes a hydraulic cylinder including an oil chamber filled with working oil, a piston movably fitted in the hydraulic cylinder and that partitions the oil chamber into a first oil chamber and a second oil chamber, a piston rod coupled to the piston and projecting from one end portion of the hydraulic cylinder, a free piston movably fitted in the hydraulic cylinder and that partitions the hydraulic cylinder into a gas chamber filled with a high-pressure gas and the oil chamber to pressurize the working oil in the oil chamber, a spring member that cancels an axial-direction force acting on the piston rod due to a difference between pressure-receiving areas of two surfaces of the piston, a working oil passage that allows the first oil chamber and the second oil chamber to communicate with each other, and a throttle in the working oil passage; the first hydraulic damper, the second hydraulic damper, and the linking member are aligned in a longitudinal direction of the vibration damping device, one of the hydraulic cylinder and the piston rod of the first hydraulic damper is coupled to the linking member, and the other of the hydraulic cylinder and the piston rod of the first hydraulic damper is attached to the first attachment position, and one of the hydraulic cylinder and the piston rod of the second hydraulic damper is coupled to the linking member, and the other of the hydraulic cylinder and the piston rod of the second hydraulic damper is attached to the second attachment position.

Each of the first and second hydraulic dampers generates a damping force when the piston and hydraulic cylinder move relative to each other. The damping force generated by the first hydraulic damper directly acts on the first attachment position of a vehicle body from one of the hydraulic cylinder and piston rod. The damping force generated by the second hydraulic damper directly acts on the second attachment position of the vehicle body from one of the hydraulic cylinder and piston rod.

Accordingly, vibrations of the vehicle body are evenly damped in the first and second attachment portions of the vehicle body.

The working oil filled in the hydraulic damper has a viscosity. Also, in the hydraulic damper including the hydraulic cylinder and piston, if the moving velocity of the piston is low with respect to the hydraulic cylinder, e.g., in the initial stage of an operation, the working oil leaks from a so-called leak portion such as a seat portion of the check valve or a sliding portion of the piston. When the working oil leaks, a damping force which is large compared to the low piston moving velocity is generated by a magnitude based on the viscous resistance of the working oil. The magnitude of this damping force decreases when the moving distance of the piston with respect to the hydraulic cylinder relatively shortens.

When the linking member is rigid in the vibration damping device, the moving amount of the piston with respect to the hydraulic cylinder in each hydraulic damper is ½ the displacement amount between the two ends of the vibration damping device. Note that in the conventional vibration damping device for a vehicle body using only one hydraulic damper, the moving amount of the piston with respect to the hydraulic cylinder matches the displacement amount between the two ends of the vibration damping device.

Therefore, when compared to the conventional vibration damping device for a vehicle body using only one hydraulic damper, the amount of working oil which leaks when the moving velocity of the piston with respect to the hydraulic cylinder is low is significantly reduced, and the damping force to be generated based on the viscous resistance of the working oil decreases. Consequently, the vibration of a vehicle body is moderately damped in the initial stage of an operation.

Furthermore, each of the first and second hydraulic dampers also functions as a so-called viscous damper which consumes energy by using the viscous resistance of the working oil. Accordingly, the vibration damping device dampens a high-frequency vibration as well regardless of the propagation direction of the vibration. The vibration damping device includes a plurality of hydraulic dampers. When compared to the conventional vibration damping device for a vehicle body including only one hydraulic damper, therefore, the performance of damping a high-frequency vibration is high, and the high-frequency vibration is damped in a well-balanced manner.

Accordingly, preferred embodiments of the present invention provide a vibration damping device for a vehicle body that further improves the riding comfort of the vehicle.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2A is a plan view showing details of the arrangement of the vibration damping device for a vehicle body according to the first preferred embodiment of the present invention.

FIG. 2B is a side view showing the details of the arrangement of the vibration damping device for a vehicle body according to the first preferred embodiment of the present invention.

FIG. 8A is a plan view showing details of the arrangement of a vibration damping device for a vehicle body according to a third preferred embodiment of the present invention.

FIG. 8B is a side view showing the details of the arrangement of the vibration damping device for a vehicle body according to the third preferred embodiment of the present invention.

FIG. 9 is a plan view showing an outline of the arrangement of a vibration damping device for a vehicle body according to a fourth preferred embodiment of the present invention, and shows a state in which the vibration damping device for a vehicle body is attached to a vehicle body.

FIG. 10 is a plan view showing an outline of the arrangement of a vibration damping device for a vehicle body according to a fifth preferred embodiment of the present invention, and shows a state in which the vibration damping device for a vehicle body is attached to a vehicle body.

DETAILED DESCRIPTION OF THE PREFERRED EMBODIMENTS

First Preferred Embodiment

A first preferred embodiment of a vibration damping device for a vehicle body according to the present invention will be explained in detail below with reference to FIGS. 1 to 5.

Figure 1:
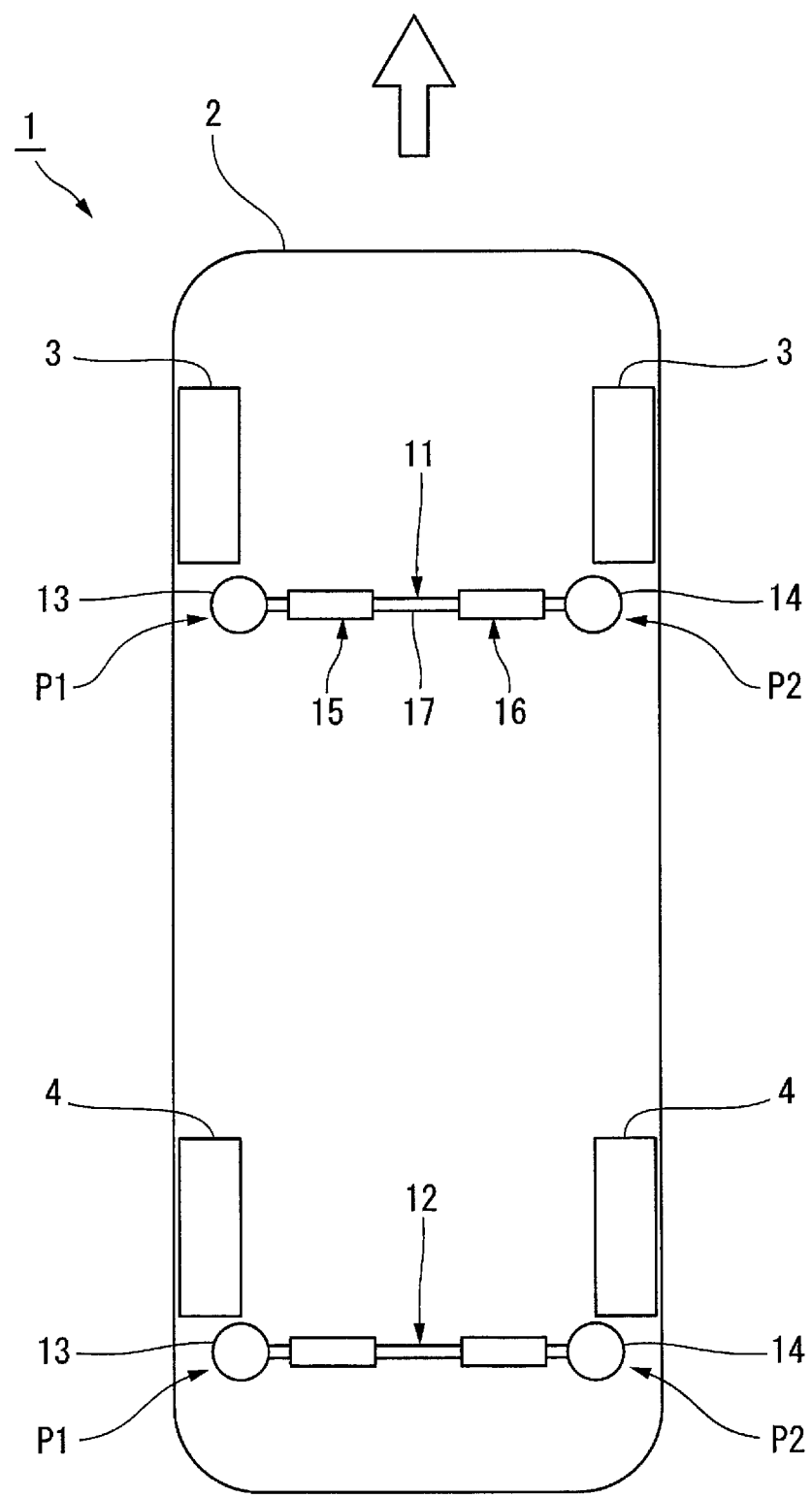
FIG. 1 is a plan view showing an outline of the arrangement of a vibration damping device for a vehicle body according to a first preferred embodiment of the present invention, and shows a state in which the vibration damping device for a vehicle body is attached to a vehicle body.

A vehicle 1 shown in FIG. 1 runs as it is driven by a driver (not shown), and is, for example, a passenger car or the like.

A vehicle body 2 of the vehicle 1 includes a pair of left and right front wheels 3 and a pair of left and right rear wheels 4.

The vehicle body 2 of this kind includes, e.g., a monocoque body made of a high tensile strength steel plate or the like. The vehicle body 2 elastically deforms when an external force is applied during running, and vibrates in, e.g., the lateral or longitudinal direction. Examples of the external force which generates this vibration are a force which is applied to the vehicle body 2 when the front wheel 3 and the rear wheel 4 run over a projection or recess during running, and a force which is applied from a vibrating engine (not shown). Also, in the vehicle 1 of this kind, the vehicle body 2 sometimes vibrates when a door of the cabin (not shown) is closed. The vibration of the vehicle body 2 like this sometimes gives a passenger discomfort.

In addition, an audio system (not shown) is sometimes installed in the cabin of the vehicle 1 of this kind. The sound of this audio system contains many frequency components (about 500 Hz) higher than the frequencies (about 40 Hz) of the vehicle vibration during running. The vehicle body sometimes resonates with this audio sound, and the resonance sometimes exerts influence on the audio effect in this case.

To damp the unnecessary vibrations of the vehicle body 2 as described above, the vehicle 1 according to this preferred embodiment includes a first vibration damping device 11 for a vehicle body in the front portion of the vehicle body 2, and a second vibration damping device 12 in the rear portion of the vehicle body 2. The first and second vibration damping devices 11 and 12 are preferably identical devices.

The first and second vibration damping devices 11 and 12 each include a first end portion attached to a predetermined first attachment position P1 of the vehicle body 2, and a second end portion attached to a predetermined second attachment position P2. Note that the same effect is obtained even when there is a height difference between the first and second attachment positions P1 and P2.

As shown in FIG. 1, the first and second attachment positions P1 and P2 may be the upper end portions of a pair of left and right suspension towers 13 and 14 as elements of a wheel suspension device. That is, the first and second vibration damping devices 11 and 12 according to this preferred embodiment each include a first end portion (an end portion on the vehicle body left side) attached to the suspension tower 13 positioned on the vehicle body left side, and a second end portion attached to the suspension tower 14 positioned on the vehicle body right side. Note that the suspension towers 13 and 14 shown in FIG. 1 are drawn behind the front wheels 3 or rear wheels 4, unlike their actual positions.

Each of the first and second vibration damping devices 11 and 12 includes first and second hydraulic dampers 15 and 16 positioned on the two sides in the longitudinal direction of the vibration damping device, and a linking rod 17 positioned between the first and second hydraulic dampers 15 and 16. As will be described in detail below, the first hydraulic damper 15, the second hydraulic damper 16, and the linking rod 17 are aligned in the longitudinal direction of the vibration damping device. In each of the first and second vibration damping devices 11 and 12 according to this preferred embodiment, these members are aligned on the same axial line. The linking rod 17 is "a linking member" according to this preferred embodiment of the present invention.

The first and second hydraulic dampers 15 and 16 are preferably identical. As shown in FIGS. 2A and 2B, one end portion of each of the first and second hydraulic dampers 15 and 16, which is attached to the suspension tower 13 or 14, includes a hydraulic cylinder 18 (to be described below). That is, the hydraulic cylinder 18 of the first hydraulic damper 15 is attached to the first attachment position P1 (the suspension tower 13 on the vehicle body left side). Also, the hydraulic cylinder 18 of the second hydraulic damper 16 is attached to the second attachment position P2 (the suspension tower 14 on the vehicle body right side).

The other end portion of each of the first and second hydraulic dampers 15 and 16 includes a piston rod 19 (to be described below). The piston rod 19 of the first hydraulic damper 15 is coupled to the piston rod 19 of the second hydraulic damper 16 via the linking rod 17. That is, the piston rods 19 of the first and second hydraulic dampers 15 and 16 are coupled to each other via the linking rod 17.

Figure 3:
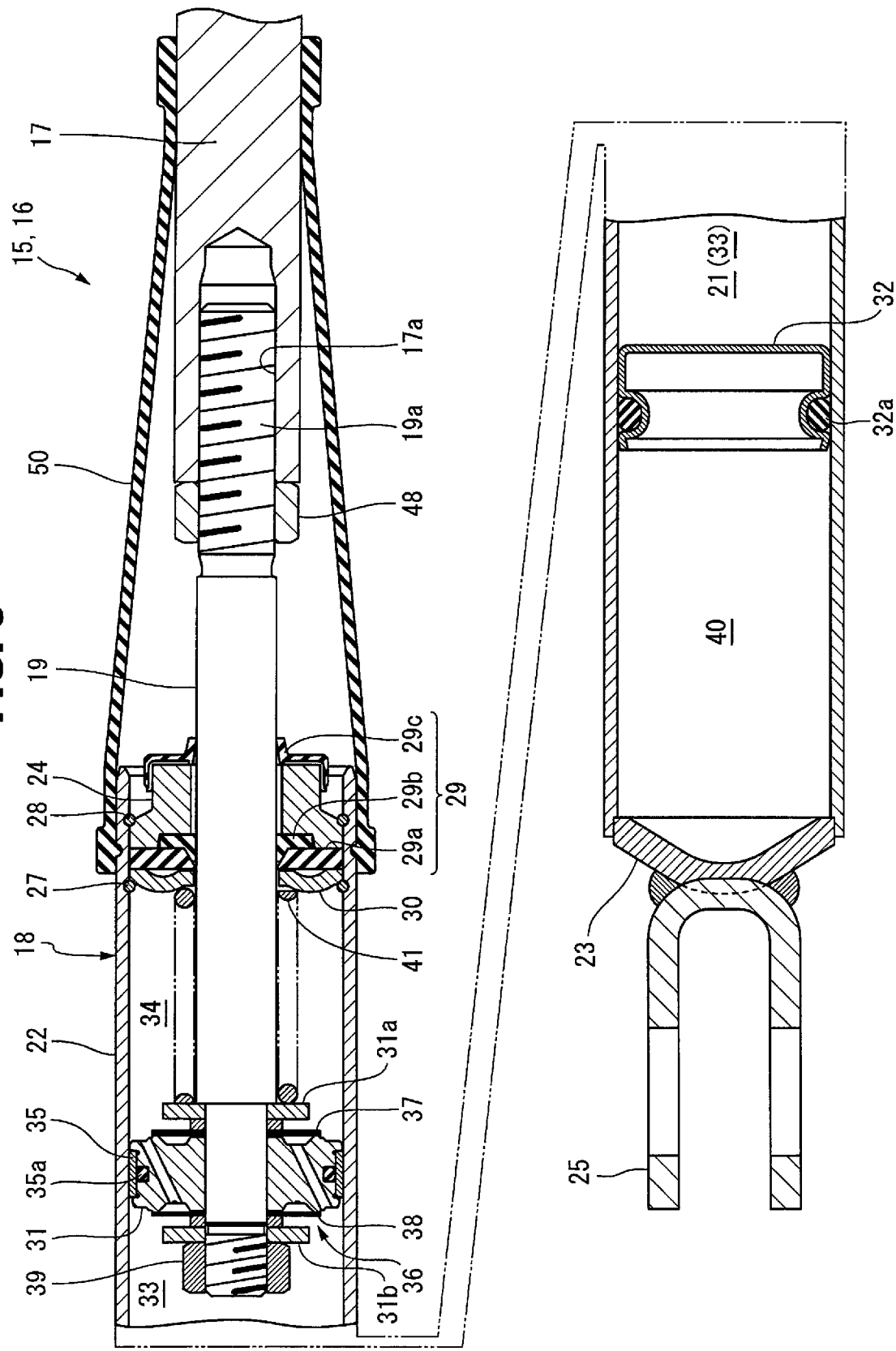
FIG. 3 is a sectional view taken along a line III-III in FIG. 2A.

The hydraulic cylinder 18 of each of the first and second hydraulic dampers 15 and 16 includes an oil chamber 21 filled with working oil. As shown in FIG. 3, the hydraulic cylinder 18 includes a cylinder tube 22 defined by a cylindrical member, and first and second lid members 23 and 24 attached to the cylinder tube 22. The first lid member 23 closes one end (the left end in FIG. 3) of the cylinder tube 22.

The first lid member 23 is fitted in and welded, for example, to the cylinder tube 22. An attaching member 25 including a U-shaped section is welded, for example, to the first lid member 23. The attaching member 25 is fixed by, for example, a fixing bolt (not shown) to an attaching bracket 26 (see FIG. 2A) provided on the upper end portion of each of the suspension towers 13 and 14. That is, the hydraulic cylinder 18 according to this preferred embodiment is attached to the suspension tower 13 or 14 via the attaching member 25 and the attaching bracket 26. The attaching bracket 26 preferably has a rigidity by which the vibration of the vehicle body 2 is transmitted to the hydraulic cylinder 18. The vibration damping device for a vehicle body according to the present preferred embodiment includes a device in which the rigid structure transmits vibrations between the first and second attachment positions P1 and P2 as described above.

The second lid member 24 closes the other end of the cylinder tube 22, and movably supports the piston rod 19 (to be described below). Sealing members 29 that seal a portion through which the piston rod 19 extends are provided on the two end portions of the second lid member 24. The sealing members 29 include first and second sealing members 29$a$ and 29$b$ positioned on the side of the oil chamber 21, and a third sealing member 29$c$ positioned outside the oil chamber 21. The second lid member 24 is fitted in the cylinder tube 22, and fixed to the cylinder tube 22 together with a first spring seat 30 by circlips 27 and 28.

A piston 31 and free piston 32 are movably fitted in the cylinder tube 22. The piston 31 includes a circular section which fits in the cylinder tube 22, and partitions the oil chamber 21 of the hydraulic cylinder 18 into first and second oil chambers 33 and 34. A sealing member 35 that seals a portion between the outer circumferential portion of the piston 31 and the inner circumferential surface of the cylinder tube 22 is provided on the outer circumferential portion of the piston 31. In addition, an O-ring 35$a$ is provided on the inner circumferential side of the sealing member 35. The O-ring 35$a$ biases the sealing member 35 so as to increase its diameter outward, and seals the gap between the inner circumferential surface of the sealing member 35 and the outer circumferential portion of the piston 31. The proximal end portion of the piston rod 19 extends through the axial center of the piston 31. The piston 31 is fixed to the distal end portion of the piston rod 19 by, for example, a fixing nut 39 together with valve bodies 37 and 38 of a piston valve 36 (to be described below), a second spring seat 31a, and a washer 31b.

The first oil chamber 33 is located between the piston 31 and the free piston 32 (to be described below). The second oil chamber 34 is located between the piston 31 and the second lid member 24.

The free piston 32 is arranged at one end of the cylinder tube 22 at which the first lid member 23 is positioned, and partitions the hydraulic cylinder 18 into the oil chamber 21 and a gas chamber 40. An O-ring 32a is fitted on the outer circumferential portion of the free piston 32. The O-ring 32a seals a portion between the gas chamber 40 and the oil chamber 21. The gas chamber 40 is filled with high-pressure $N_2$ gas. Accordingly, the working oil in the oil chamber 21 is pressurized by the free piston 32.

A compression coil spring 41 is inserted in a compressed state between the piston 31 and the second lid member 24. One end portion of the compression coil spring 41, which faces the second lid member 24, abuts against the first spring seat 30, and the other end portion abuts against the second spring seat 31a. The piston rod 19 extends through the central portion of the compression coil spring 41. The piston 31 is biased by the spring force of the compression coil spring 41 in a direction in which the hydraulic damper 15 or 16 contracts (leftward in FIG. 3).

The compression coil spring 41 cancels an axial-direction force which acts on the piston rod 19 due to the difference between the pressure-receiving areas of the two surfaces of the piston 31. This axial-direction force is generated when the pressure-receiving area of the piston 31 on the side of the second oil chamber 34 is smaller than that on the side of the first oil chamber 33, and pushes the piston rod 19 in a direction in which the hydraulic damper 15 or 16 extends. The compression coil spring 41 corresponds to "a spring member" of this preferred embodiment of the present invention.

The free lengths of the first and second hydraulic dampers 15 and 16 according to this preferred embodiment are balanced because the above-described axial-direction force is canceled by the spring force of the compression coil spring 41. The pressure of $N_2$ gas is adjusted so that the free lengths of the first and second hydraulic dampers 15 and 16 match the dimension of attachment to the vehicle body 2.

The free lengths match the dimension of attachment to the vehicle body 2 as described above, and this facilitates attaching the first and second vibration damping devices 11 and 12 to the vehicle body 2. Also, the initial load is 0 when the first and second vibration damping devices 11 and 12 are attached to the vehicle body 2. Therefore, the first and second hydraulic dampers 15 and 16 contract with a high responsiveness, and generate a damping force.

Figure 4:
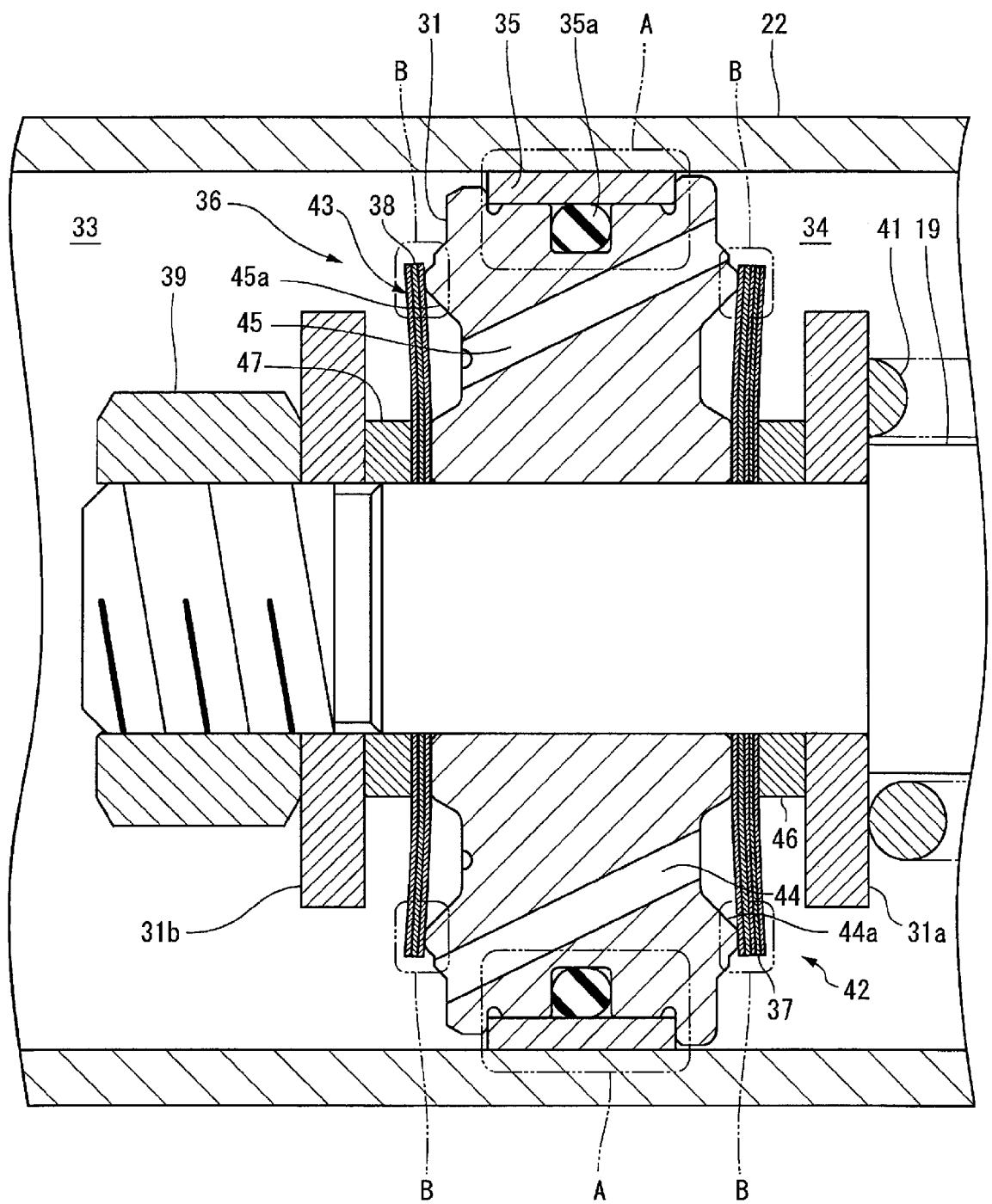
FIG. 4 is a sectional view showing a piston portion of a hydraulic damper according to the first preferred embodiment of the present invention in an enlarged scale.

The piston valve 36 in the piston 31 preferably has the same structure as that used in a suspension device shock absorber or the like of the vehicle 1. As shown in FIG. 4, the piston valve 36 includes first and second throttles 42 and 43. The first throttle 42 is located in a first working oil passage 44 extending through the piston 31. The second throttle 43 is located in a second working oil passage 45 extending through the piston 31.

The end portion of the first working oil passage 44, which faces the second oil chamber 34, is defined by an annular recessed portion 44a.

The first throttle 42 defines a check valve to close the recessed portion 44a, and includes a plurality of disk-shaped valve bodies 37. The valve bodies 37 are attached to the piston rod 19 as they are pushed against the outer edge of the recessed portion 44a by their own spring forces. That is, the inner circumferential portions of the valve bodies 37 are fitted on the piston rod 19, and pushed against the piston 31 by a first spacer 46 on the piston rod 19 while the nut 39 is fastened.

The first spacer 46 is attached to the piston rod 19 in a state in which the movement in the direction away from the piston 31 is regulated together with the second spring seat 31a. When the inner circumferential portions of the valve bodies 37 are thus urged against the piston 31, the valve bodies 37 deform and are pushed against the outer edge of the recessed portion 44a with a predetermined initial load.

As a consequence, the valve bodies 37 of the first throttle 42 are pushed with a predetermined initial load against the opening of the first working oil passage 44, which faces the second oil chamber 34, thus closing the opening. Accordingly, the valve bodies 37 open when the oil pressure of the first oil chamber 33 becomes higher than the initial load of the valve bodies 37.

The end portion of the second working oil passage 45, which faces the first oil chamber 33, is defined by an annular recessed portion 45a. The second throttle 43 defines a check valve to close the recessed portion 45a, and includes a plurality of disc-shaped valve bodies 38. The valve bodies 38 are attached to the piston rod 19 as they are pushed against the outer edge of the recessed portion 45a by their own spring forces. That is, the inner circumferential portions of the valve bodies 38 are fitted on the piston rod 19, and pushed against the piston 31 by a second spacer 47 on the piston rod 19 while the nut 39 is fastened.

The second spacer 47 is attached to the piston rod 19 in a state in which the movement in the direction away from the piston 31 is regulated together with the washer 31b. When the inner circumferential portions of the valve bodies 38 are thus urged against the piston 31, the valve bodies 38 deform and are pushed against the outer edge of the recessed portion 45a with a predetermined initial load.

As a consequence, the valve bodies 38 of the second throttle 43 are pushed with a predetermined initial load against the opening of the second working oil passage 45, which faces the first oil chamber 33, thus closing the opening. Accordingly, the valve bodies 38 open when the oil pressure of the second oil chamber 34 becomes higher than the initial load of the valve bodies 38.

The thickness and number of the valve bodies 37 of the first throttle 42 and those of the valve bodies 38 of the second throttle 43 are determined based on the magnitudes of the damping forces to be generated by the first and second hydraulic dampers 15 and 16. When the spring forces of the valve bodies 37 and 38 increase, the damping forces to be generated increase. The magnitudes of the damping forces of the first and second vibration damping devices 11 and 12 are equal to the magnitude of the damping force when using only one hydraulic damper.

As shown in FIG. 3, the distal end portion of the piston rod 19 projects outside the cylinder tube 22 through the second lid member 24, and is connected to the end portion of the linking rod 17 by a screw, for example. The linking rod 17 preferably includes a round metal rod, for example. Female screws 17a that attach the first and second hydraulic dampers 15 and 16 are provided in the two end portions of the linking rod 17.

The connecting portion between the piston rod 19 and the linking rod 17 includes a structure by which a male screw 19a on the piston rod 19 is threadably engaged with the female screw 17a of the linking rod 17 and fastened by a lock nut 48. This screwing structure of the linking rod 17 makes it possible to finely adjust the free lengths of the first and second vibration damping devices 11 and 12, which change in accordance with variations in $N_2$ gas pressure. As shown in FIGS. 2A and 2B, flat surfaces 49 for hooking a tool (not shown) on the linking rod 17 made of a round rod are provided in the central portion of the linking rod 17 in the longitudinal direction. The flat surfaces 49 are parallel or substantially parallel to each other in two portions of the outer circumferential portion of the linking rod 17. The work of fastening the lock nut 48 described above is performed in a state in which the rotation of the linking rod 17 is regulated by engaging a tool with the flat surfaces 49.

As shown in FIG. 3, the coupling portion between the piston rod 19 and the linking rod 17 is covered with a rubber boot 50 to connect the linking rod 17 and cylinder tube 22. The rubber boot 50 prevents muddy water or dust from attaching to the piston rod 19, and preferably has the shape of a conical cylinder. The rubber boot 50 includes one end portion fixed to the outer circumferential surface of the cylinder tube 22, and the other end portion fixed to the outer circumferential surface of the linking rod 17.

An example of the procedure of attaching the first and second vibration damping devices 11 and 12 to the vehicle body 2 will be explained below. To perform this attachment, the first and second vibration damping devices 11 and 12 are first temporarily assembled. This temporary assembly is, e.g., a state in which one end portion of the linking rod 17 is connected to the piston rod 19 of the first hydraulic damper 15, and the piston rod 19 of the second hydraulic damper is temporarily screwed into the other end portion of the linking rod 17. The piston rod 19 of the first hydraulic damper 15 and the linking rod 17 are connected by fastening the lock nut 48 in this temporary assembled state. The lock nut 48 is fastened in a state in which the rotation of the linking rod 17 is regulated by engaging a tool with the flat surfaces 49 of the linking rod 17.

Then, the attaching member 25 in the first hydraulic damper 15 described above is temporarily attached to the attaching bracket 26 of the suspension tower 13 by a fixing bolt (not shown). Subsequently, the screwing amount between the other end portion of the linking rod 17 and the piston rod 19 of the second hydraulic damper 19 is adjusted, and the attaching member 25 of the second hydraulic damper 16 is temporarily attached to the attaching bracket 26 of the suspension tower 14.

That is, the total length of the first and second vibration damping devices 11 and 12 is adjusted in accordance with the spacing between the pair of left and right suspension towers 13 and 14. Then, the lock nut 48 of the second hydraulic damper 16 is fastened in a state in which the first and second vibration damping devices 11 and 12 are held by the vehicle body 2. This work of fastening the lock nut 48 is performed while regulating the rotation of the linking rod 17 by engaging a tool with the flat surfaces 49 of the linking rod 17. By thus fastening the lock nut 48, the piston rod 19 of the second hydraulic damper 16 is connected to the linking rod 17.

After that, the attaching members 25 of the first and second hydraulic dampers 15 and 16 are finally fixed to the attaching brackets 26 by fixing bolts, thus completing the work of attaching the first and second vibration damping devices 11 and 12 to the vehicle body 2.

The first and second vibration damping devices 11 and 12 each include the first and second hydraulic dampers 15 and 16 at the two end portions. Each of the first and second hydraulic dampers 15 and 16 generates a damping force when the hydraulic cylinder 18 and piston 31 move relative to each other. The damping force generated by the first hydraulic damper 15 directly acts on the first attachment position P1 of the vehicle body 2 from the hydraulic cylinder 18. The damping force generated by the second hydraulic damper 16 directly acts on the second attachment position P2 of the vehicle body 2 from the hydraulic cylinder 18.

Consequently, the vibration of the vehicle body 2 is evenly damped in the first and second attachment positions P1 and P2.

If the spacing between the pair of left and right suspension towers 13 and 14 changes due to the vibration of the vehicle body 2, the piston 31 moves in the axial direction (the lateral direction of the vehicle body 2) with respect to the cylinder tube 22 in each of the first and second hydraulic dampers 15 and 16. Each of the first and second hydraulic dampers 15 and 16 is held in a state in which the working oil is pressurized by high-pressure $N_2$ gas, and all the elastically deformable sealing members 29 facing the oil chamber 21, the O-ring 35 of the piston 31, and the O-ring 32a of the free piston 32 cannot elastically deform any more. In each of the first and second vibration damping devices 11 and 12, therefore, the working oil flows with a high responsiveness between the first and second oil chambers 33 and 34, so a damping force is generated with a high responsiveness even when the moving amount of the piston 31 is a few ten microns, for example.

When the vibration of the vehicle body 2 is transmitted to each of the first and second vibration damping devices 11 and 12 and the piston 31 starts moving with respect to the cylinder tube 22, the working oil first flows into a leakable gap. This "leakable gap" is a gap through which the working oil flows between the first and second oil chambers 33 and 34. This leakable gap will be called a leak portion hereinafter. The leak portions of the first and second hydraulic dampers 15 and 16 according to this preferred embodiment are a leak portion within a range enclosed with an alternate long and two short dashed line A in FIG. 4, and a leak portion within a range enclosed with an alternate long and two short dashed line B in FIG. 4. In the following description, the leak portion indicated by the alternate long and two short dashed line A will be called a first leak portion A, and the leak portion indicated by the alternate long and two short dashed line B will be called a second leak portion B.

The first leak portion A is a gap which functions as a clearance between the piston 31 and the cylinder tube 22. The second leak portion B is a gap between the valve bodies 37 and 38 of the first and second throttles 42 and 43, and the outer edges of the recessed portions 44a and 45a of the piston 31. The working oil has a viscosity. Therefore, immediately after the piston 31 starts moving and before the valve bodies 37 and 38 open, the working oil leaks through the first and second leak portions A and B, thus generating a damping force having a magnitude corresponding to the magnitude of the viscous resistance of the working oil.

Figure 5:
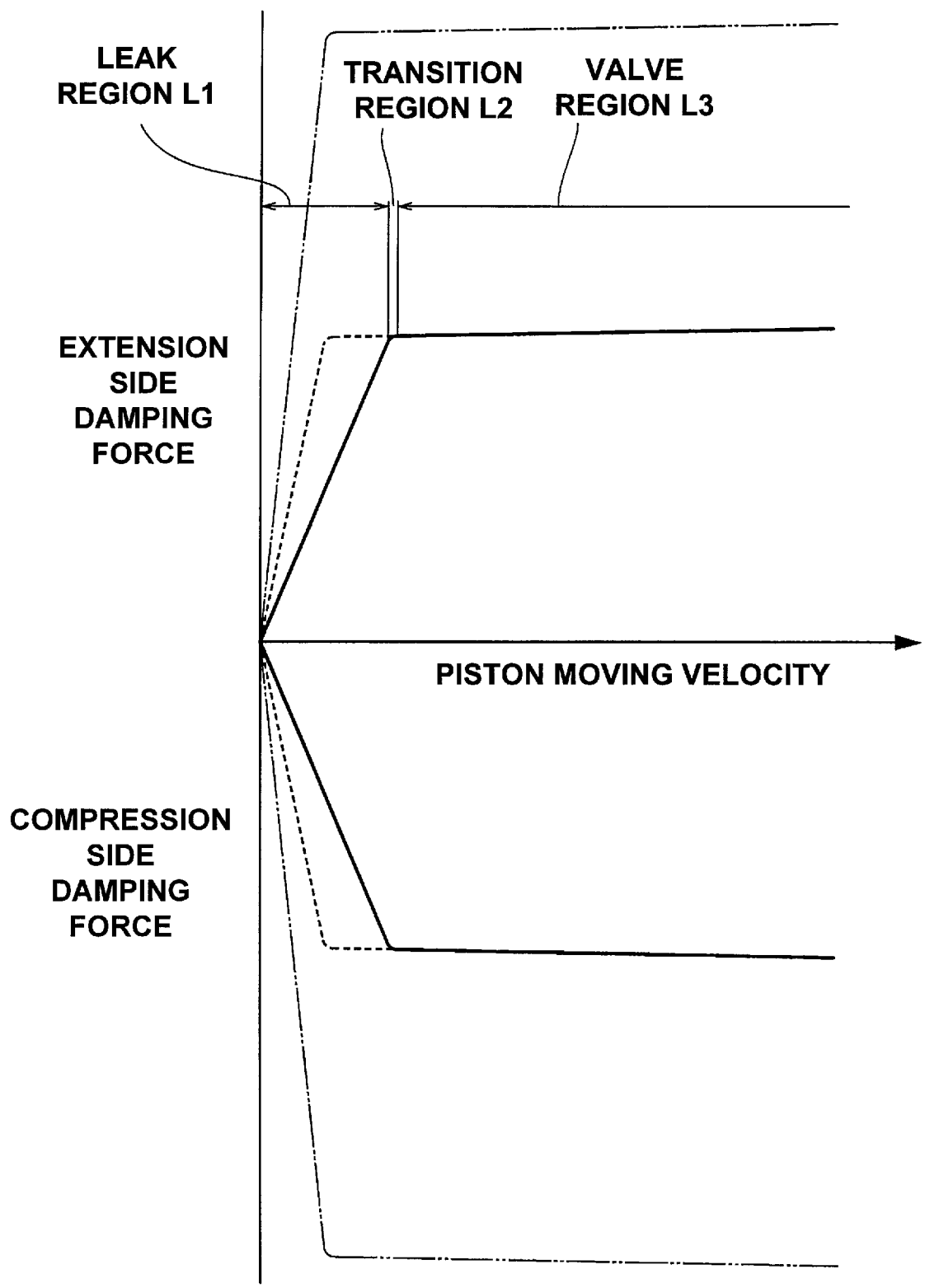
FIG. 5 is a graph showing the relationship between the moving velocity of a piston and the magnitude of a damping force.

As shown in FIG. 5, the magnitude of the damping force immediately after the piston 31 starts moving changes almost in proportion to the moving velocity of the piston 31. In the following description, this damping force based on the viscous resistance of the working oil will simply be referred to as a low-velocity damping force. Referring to FIG. 5, the solid line indicates the change in damping force of the vibration damping device according to this preferred embodiment, and the broken line indicates the change in damping force when using only one hydraulic damper. Also, the alternate long and two short dashed line in FIG. 5 indicates the change in damping force when using two hydraulic dampers in parallel. Using two hydraulic dampers in parallel means that the two hydraulic dampers are arranged between the left and right suspension towers 13 and 14.

The moving amount of the piston 31 of each of the first and second hydraulic dampers 15 and 16 according to this preferred embodiment is half the displacement amount between the two ends of each of the first and second vibration damping devices 11 and 12, for example. As indicated by the solid line in FIG. 5, therefore, the magnitude of the low-velocity damping force of each of the first and second vibration damping devices 11 and 12 according to this preferred embodiment is ½ that of the conventional device (indicated by the broken line in FIG. 5) using only one hydraulic damper, for the same moving velocity of the piston 31, for example. In this preferred embodiment, therefore, when compared to the device using only one hydraulic damper, the amounts of working oil leaking through the first and second leak portions A and B are reduced when the moving velocity of the piston 31 of each of the first and second hydraulic dampers 15 and 16 is significantly low. This decreases the damping force to be generated based on the viscous resistance of the working oil.

As a consequence, the vibration of the vehicle body 2 is moderately damped when the moving velocity of the piston 31 of each of the first and second hydraulic dampers 15 and 16 is low, e.g., in the initial stage of an operation.

As shown in FIG. 5, when the moving velocity of the piston 31 rises after the start of movement in each of the first and second vibration damping devices 11 and 12 according to this preferred embodiment, the operation changes from a leak region L1 in which the low-velocity damping force is generated to a valve region L3 in which the piston valve 36 generates a predetermined damping force, through a transition region L2 in which the valve bodies 37 and 38 of the first and second throttles 42 and 43 start opening.

As shown in FIG. 5, the moving velocity of the piston 31 when the operation changes to the valve region L3 in each of the first and second vibration damping devices 11 and 12 is higher than that of the piston 31 when using only one hydraulic damper (indicated by the broken line in FIG. 5). This means that the rise in damping force in the initial stage of the operation is relaxed and the riding comfort is improved.

After the operation has shifted to the valve region L3, the ratio at which the magnitude of the damping force increases is much lower than the ratio at which the moving velocity of the piston 31 rises.

Each of the first and second hydraulic dampers 15 and 16 according to this preferred embodiment functions as a so-called viscous damper which consumes energy by using the viscous resistance of the working oil stored in the first and second oil chambers 33 and 34. Therefore, the first and second vibration damping devices 11 and 12 according to this preferred embodiment damp even a high-frequency vibration regardless of the propagation direction of the vibration. Since the first and second vibration damping devices 11 and 12 each include the first and second hydraulic dampers 15 and 16, the amount of working oil increases, so the performance of damping high-frequency vibrations improves compared to the conventional vibration damping device using only one hydraulic damper.

Accordingly, this preferred embodiment provides a vibration damping device for a vehicle body that further improves the riding comfort of a vehicle.

In each of the first and second vibration damping devices 11 and 12 according to this preferred embodiment, the piston rods 19 of the first and second hydraulic dampers 15 and 16 are coupled to each other via the linking rod 17. Also, the hydraulic cylinder 18 of the first hydraulic damper 15 is attached to the first attachment position P1. The hydraulic cylinder 18 of the second hydraulic damper 16 is attached to the second attachment position P2.

Accordingly, the first and second vibration damping devices 11 and 12 according to this preferred embodiment are securely attached to the vehicle body 2 because the two end portions of each device include the hydraulic cylinders 18 having a relatively high rigidity.

The first and second hydraulic dampers 15 and 16 according to this preferred embodiment preferably have the same damping performance.

Accordingly, the above-described low-velocity damping force of the first and second hydraulic dampers 15 and 16 is ½ that of the conventional vibration damping device using only one hydraulic damper. Also, the ability to damp a high-frequency vibration when the first and second hydraulic dampers 15 and 16 function as viscous dampers is twice that of the conventional vibration damping device using only one hydraulic damper. In addition, the first and second hydraulic dampers 15 and 16 damp this high-frequency vibration in a well-balanced manner.

Accordingly, this preferred embodiment provides a vibration damping device for a vehicle body that further improves the riding comfort of a vehicle.

The first attachment position P1 according to this preferred embodiment is the suspension tower 13 on the vehicle body left side, which is positioned at one end portion of the vehicle body 2 in the lateral direction. Also, the second attachment position P2 is the suspension tower 14 on the vehicle body right side, which is positioned at the other end portion of the vehicle body 2 in the lateral direction.

In this preferred embodiment, therefore, the vibration damping device is attached to the pair of left and right suspension towers 13 and 14 having a high rigidity because they are elements of the suspension device. As a consequence, the vibration of the vehicle body 2 in the lateral direction is reliably damped, so the riding comfort improves. In addition, the first and second hydraulic dampers 15 and 16 are arranged in symmetrical positions of the vehicle body 2 in the lateral direction. This makes the damping amounts of the above-described high-frequency vibration equal on the left and right sides of the vehicle body.

Each of the first and second vibration damping devices 11 and 12 according to this preferred embodiment extends between the pair of left and right suspension towers 13 and 14. However, the present invention is not limited to this. A vibration damping device according to a preferred embodiment of the present invention may be attached to another portion of the vehicle body 2 in a state in which the device extends in the lateral direction. Also, the vibration damping devices need not be installed in the front and rear portions of the vehicle body 2. The above-described effects of this preferred embodiment are obtained even when the vibration damping device is installed in one of the front and rear portions of the vehicle body 2, or installed in only the central portion of the vehicle body 2 in the longitudinal direction. Examples of the attachment position of the vibration damping device are a vehicle body frame, a suspension device attachment seat positioned in a lower portion of a vehicle body, and a floor panel when the vehicle body 2 is a monocoque body. Furthermore, the vibration damping device may be attached to a bumper reinforcement in a state in which the device stretches in the lateral direction of the vehicle body 2.

Second Preferred Embodiment

Figure 6A:
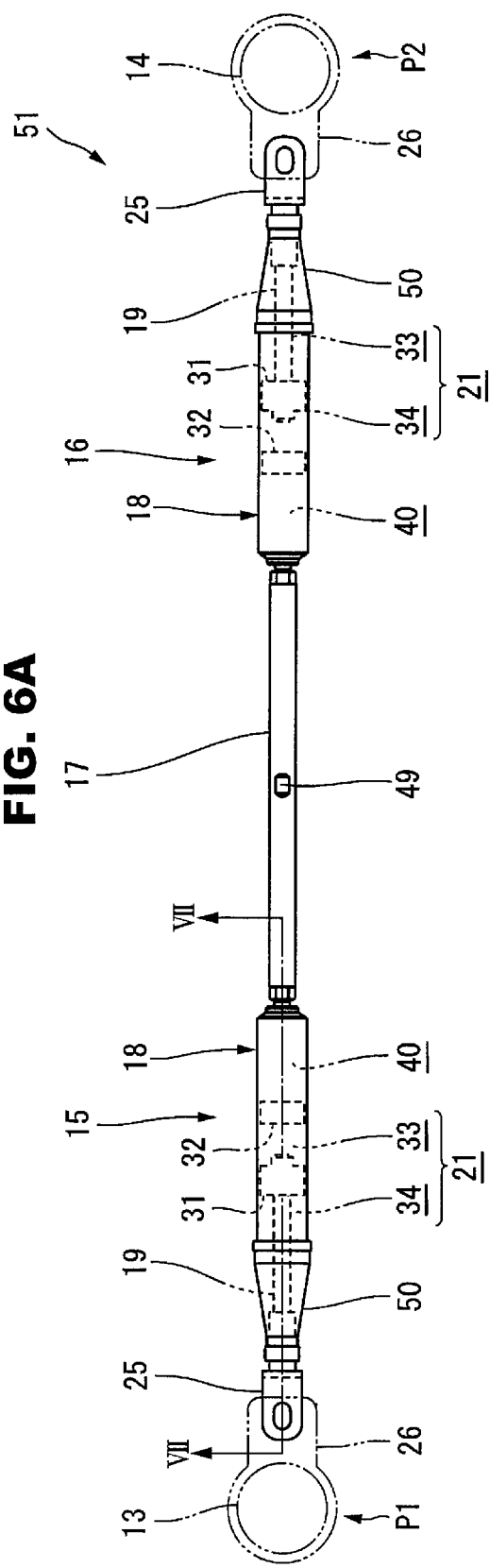
FIG. 6A is a plan view showing details of the arrangement of a vibration damping device for a vehicle body according to a second preferred embodiment of the present invention.
Figure 6B:
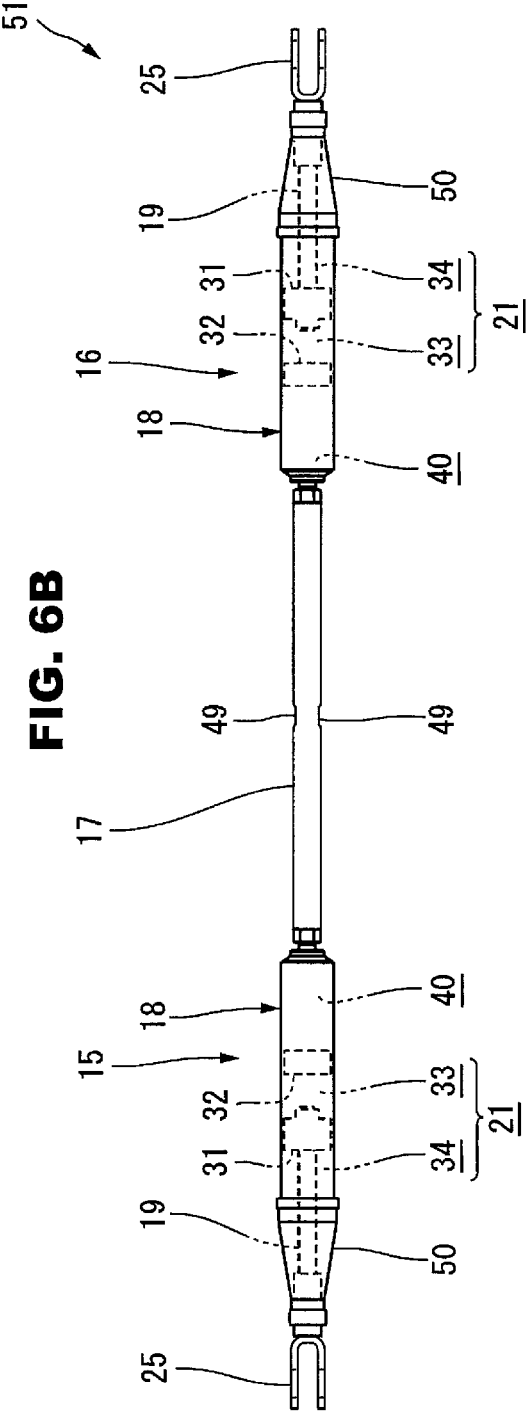
FIG. 6B is a side view showing the details of the arrangement of the vibration damping device for a vehicle body according to the second preferred embodiment of the present invention.
Figure 7:
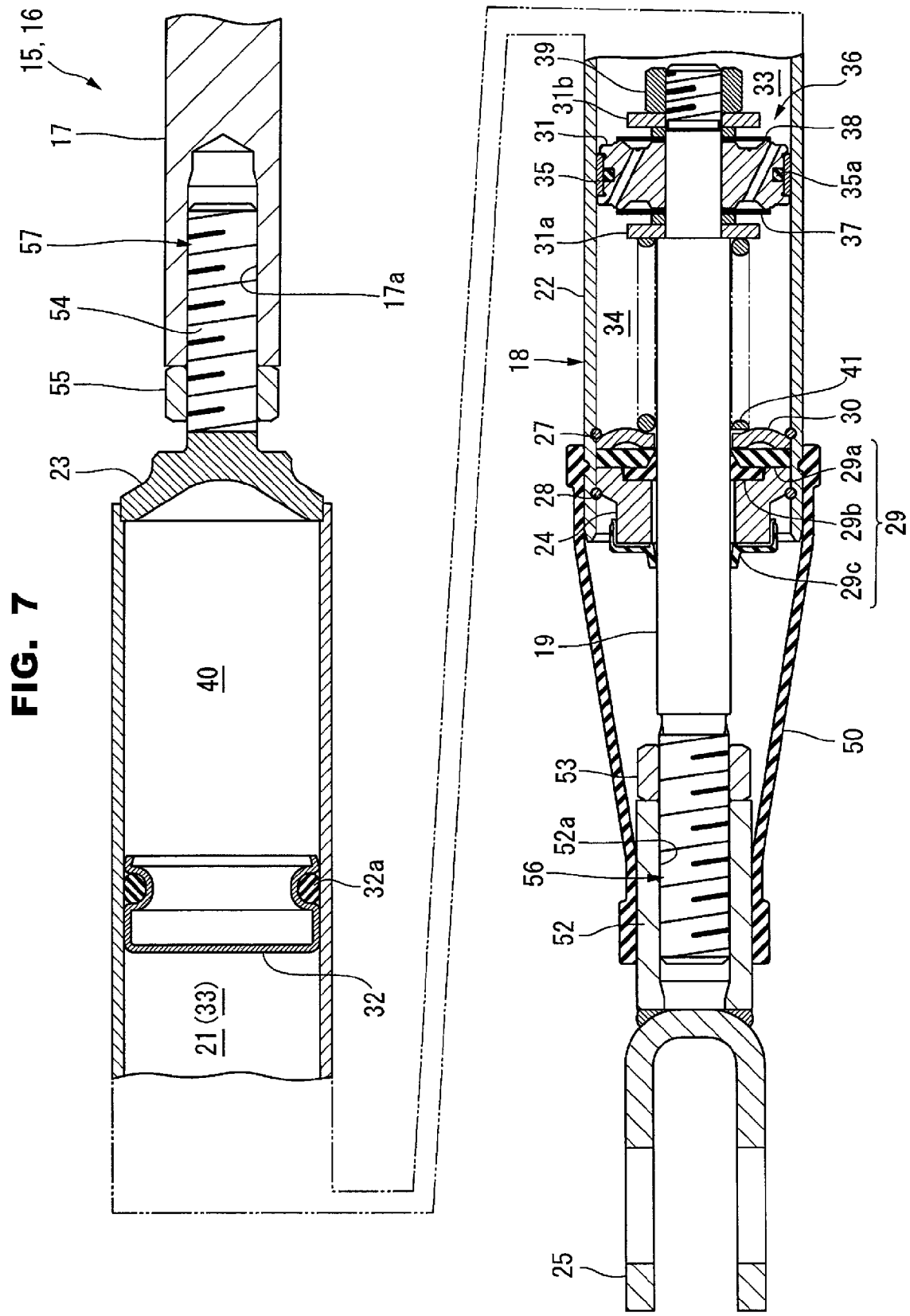
FIG. 7 is a sectional view taken along a line VII-VII in FIG. 6A.

The vibration damping device according to a second preferred embodiment of the present invention may be configured as shown in FIGS. 6A, 6B, and 7. The same reference numerals in FIGS. 1 to 5 denote the same or equivalent members in FIGS. 6A, 6B, and 7, and a detailed explanation thereof will be omitted as needed.

A vibration damping device 51 shown in FIGS. 6A and 6B is assembled such that a piston rod 19 of a first hydraulic damper 15 and a piston rod 19 of a second hydraulic damper 16 are positioned in the two end portions.

The piston rod 19 of the first hydraulic damper 15 is attached to a first attachment position P1 via an attaching member 25 and an attaching bracket 26. Also, the piston rod 19 of the second hydraulic damper 16 is attached to a second attachment position P2 via an attaching member 25 and an attaching bracket 26.

As shown in FIG. 7, the piston rod 19 and the attaching member 25 are connected via a cylinder 52. The cylinder 52 is preferably welded, for example, to the attaching member 25. A female screw 52a is provided in the hollow portion of the cylinder 52. A male screw 19a on the piston rod 19 is screwed into the female screw 52a, and fixed by a lock nut 53.

On the other hand, as shown in FIGS. 6A and 6B, a hydraulic cylinder 18 of the first hydraulic damper 15 and a hydraulic cylinder 18 of the second hydraulic damper 16 are coupled to each other via a linking rod 17.

As shown in FIG. 7, the hydraulic cylinder 18 and linking rod 17 are connected via a screw shaft 54. The screw shaft 54 is a male screw integral with a first lid member 23 of the hydraulic cylinder 18. The screw shaft 54 is screwed into a female screw 17a of the linking rod 17, and fixed by a lock nut 55.

That is, in each of the first and second hydraulic dampers 15 and 16 according to this preferred embodiment, length adjusting mechanisms 56 and 57 each including a screw are provided in the two end portions. Accordingly, this preferred embodiment provides a vibration damping device that easily adjusts the length thereof.

Third Preferred Embodiment

The vibration damping device according to a third preferred embodiment of the present invention may be configured as shown in FIGS. 8A and 8B. The same reference numerals in FIGS. 1 to 5 denote the same or equivalent members in FIGS. 8A and 8B, and a detailed explanation thereof will be omitted as needed.

A vibration damping device 61 shown in FIGS. 8A and 8B is attached to a vehicle body 2 by avoiding an obstacle 62 in the vehicle body 2. In this preferred embodiment, the obstacle 62 of the vehicle body 2 is avoided by bending a linking rod 17.

That is, the linking rod 17 according to this preferred embodiment includes a first straight portion 63 positioned on the same axis as that of a first hydraulic damper 15, a second straight portion 64 positioned on the same axis as that of a second hydraulic damper 16, and a bent portion 65 connecting the straight portions 63 and 64. The bent portion 65 has a shape by which an axis C1 of the first straight portion 63 and an axis C2 of the second straight portion 64 are spaced apart by a distance D in a direction perpendicular to the axes C1 and C2. The shape and position of the bent portion 65 may be changed as needed in accordance with the shape, position, and the like of the obstacle 62.

This preferred embodiment provides a vibration damping device that is attached to the vehicle body 2 by avoiding the obstacle 62 of the vehicle body 2.

Fourth Preferred Embodiment

As shown in FIG. 9, the vibration damping device according to a fourth preferred embodiment of the present invention is attached to a vehicle body so as to extend in the longitudinal direction of the vehicle body. The same reference numerals in FIGS. 1, 8A, and 8B denote the same or equivalent members in FIG. 9, and a detailed explanation thereof will be omitted as needed.

First and second vibration damping devices 11 and 12 shown in FIG. 9 are attached to the bottom portion of a vehicle body 2 so as to extend in the longitudinal direction of the vehicle body 2. Examples of the bottom portion of the vehicle body 2 are a lower portion of a frame when the vehicle body 2 includes a frame, and a floor panel in the lower end when the vehicle body 2 is a monocoque body. Also, the first and second vibration damping devices 11 and 12 may be attached to the vehicle body 2 by using an attaching seat of a front wheel suspension device, an attaching seat of a rear wheel suspension device, or the vicinities of front and rear bumper attaching portions. The portions to which the first and second vibration damping devices 11 and 12 are attached are not particularly limited, provided that these portions have a rigidity sufficient to reliably transmit the vibration of the vehicle body 2 to the first and second vibration damping devices 11 and 12, and reliably transmit damping forces generated by the first and second vibration damping devices 11 and 12 to the vehicle body.

In this preferred embodiment, the first vibration damping device 11 is attached to one end (the left end) of the bottom portion of the vehicle body 2 in the lateral direction, and the second vibration damping device 12 is attached to the other end of the bottom portion of the vehicle body 2 in the lateral direction. The first and second vibration damping devices 11 and 12 are preferably identical. When using the preferred embodiment shown in FIG. 9, the end portion on the front side of the vehicle body 2 is a first attachment position P1, and the end portion on the rear side of the vehicle body 2 is a second attachment position P2. That is, the first attachment position P1 is located in one end portion of the vehicle body 2 in the longitudinal direction of the vehicle body 2, and the second attachment position P2 is located in the other end portion of the vehicle body 2 in the longitudinal direction of the vehicle body 2. Note that, in this preferred embodiment, the effects are obtained even if there is a height difference between the first and second attachment positions P1 and P2.

The preferred embodiment shown in FIG. 9 improves the riding comfort by damping the vibration of the vehicle body 2 in the longitudinal direction of the vehicle body 2. Also, in this preferred embodiment, first and second hydraulic dampers 15 and 16 preferably have the same damping performance, so the damping amounts of a high-frequency vibration are equal in the front and rear portions of the vehicle body 2.

The vibration damping device according to this preferred embodiment may also include a piston rod 19 attached to the vehicle body 2 as shown in FIGS. 6A, 6B, and 7, or the first and second hydraulic dampers 15 and 16 are not positioned on the same axis as shown FIGS. 8A and 8B.

Fifth Preferred Embodiment

As shown in FIG. 10, the vibration damping device according to a fifth preferred embodiment of the present invention is attached to a vehicle body 2 so as to extend obliquely. The same reference numerals in FIGS. 1 to 9 denote the same or equivalent members in FIG. 10, and a detailed explanation thereof will be omitted as needed.

First and second vibration damping devices 11 and 12 shown in FIG. 10 are attached to the bottom portion of the vehicle body 2 so as to extend obliquely. In this preferred embodiment, the first vibration damping device 11 is attached to the vehicle body 2 so as to obliquely extend from the end portion on the front left side of the vehicle to the end portion on the rear right side of the vehicle. Also, the second vibration damping device 12 is attached to the vehicle body 2 so as to obliquely extend from the end portion on the front right side of the vehicle to the end portion on the rear left side of the vehicle. Note that, in this preferred embodiment, the same effects are obtained even if there is a height difference between first and second attachment positions P1 and P2.

Even when using the arrangement shown in FIG. 10, the same effects as that obtained when using each of the above-described preferred embodiments are obtained.

Sixth Preferred Embodiment

Figure 11:
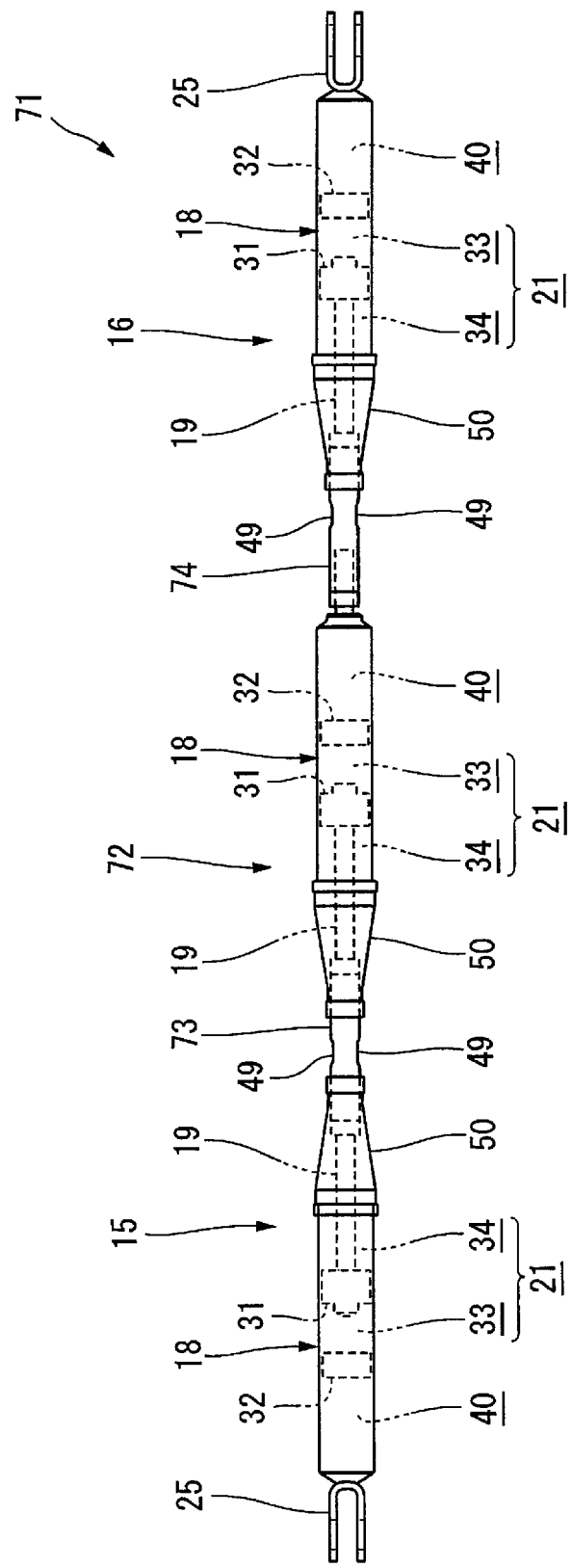
FIG. 11 is a side view showing the arrangement of a vibration damping device for a vehicle body according to a sixth preferred embodiment of the present invention.
Figure 12:
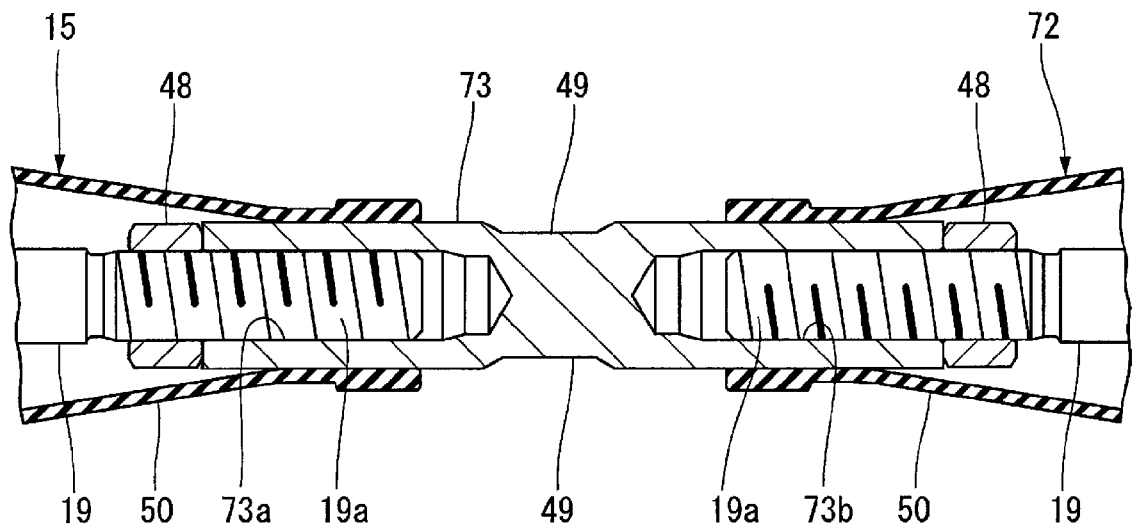
FIG. 12 is a sectional view showing a connecting portion between first and third hydraulic dampers according to the sixth preferred embodiment of the present invention in an enlarged scale.
Figure 13:
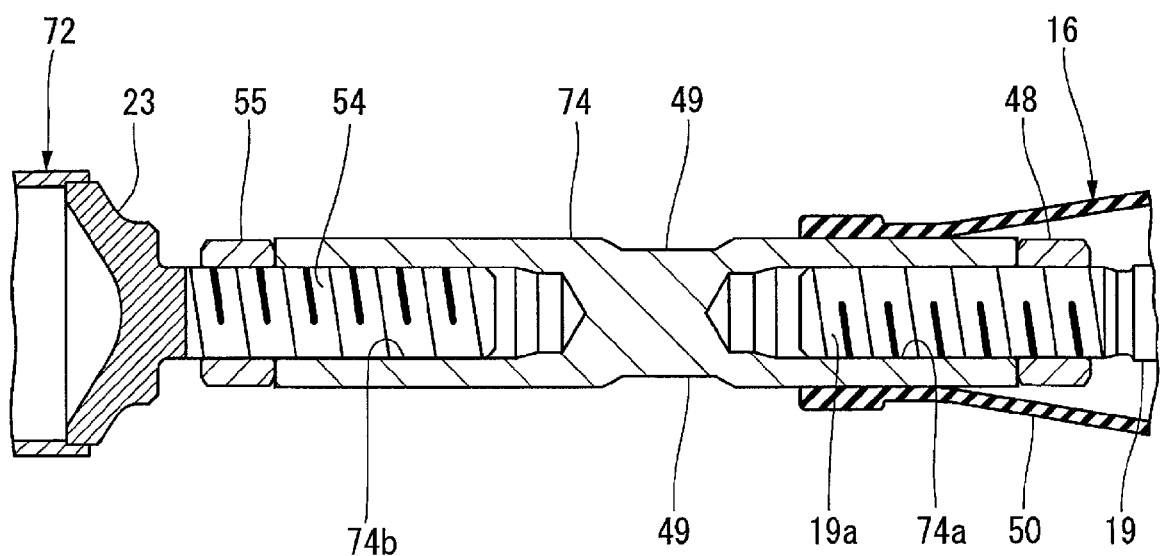
FIG. 13 is a sectional view showing a connecting portion between a second hydraulic damper and the third hydraulic damper according to the sixth preferred embodiment of the present invention in an enlarged scale.

The vibration damping device according to a sixth preferred embodiment of the present invention is configured as shown in FIGS. 11 to 13. The same reference numerals in FIGS. 1 to 10 denote the same or equivalent members in FIGS. 11 to 13, and a detailed explanation thereof will be omitted as needed.

A vibration damping device 71 shown in FIG. 11 includes first and second hydraulic dampers 15 and 16 positioned in the two end portions in the longitudinal direction, and a third hydraulic damper 72 positioned between the first and second hydraulic dampers 15 and 16. The third hydraulic damper 72 is preferably identical to the first and second hydraulic dampers 15 and 16. That is, the first, second, and third hydraulic dampers 15, 16, and 72 preferably have the same damping performance.

The first and second hydraulic dampers 15 and 16 according to this preferred embodiment are used in a state in which hydraulic cylinders 18 are positioned in the two ends of the vibration damping device 71. That is, an attaching member 25 is provided on the hydraulic cylinder 18.

A piston rod 19 of the first hydraulic damper 15 is connected to a piston rod 19 of the third hydraulic damper 72 via a linking rod 73. A piston rod 19 of the second hydraulic damper 16 is connected to a hydraulic cylinder 18 of the third hydraulic damper 72 via a linking rod 74. The third hydraulic damper 72 and linking rods 73 and 74 correspond to "a linking member" in this preferred embodiment of the present invention.

Each of the linking rods 73 and 74 preferably includes a round metal rod. Also, flat surfaces 49 to hook a tool (not shown) on each of the linking rods 73 and 74 are provided in the central portion of each of the linking rods 73 and 74 in the longitudinal direction.

As shown in FIG. 12, a female screw 73a to attach the piston rod 19 of the first hydraulic damper 15 is provided in one end portion of the linking rod 73. A female screw 73b to attach the piston rod 19 of the third hydraulic damper 72 is provided in the other end portion of the linking rod 73.

The connecting portions between the linking rod 73 and the piston rods 19 of the first and third hydraulic dampers 15 and 72 have structures in which male screws 19a on the piston rods 19 are threadably engaged with the female screws 73a and 73b of the linking rod 73, and fastened by lock nuts 48.

As shown in FIG. 13, a female screw 74a to attach the piston rod 19 of the second hydraulic damper 16 is provided in one end portion of the linking rod 74. A female screw 74b to attach a screw shaft 54 of the third hydraulic damper 72 is provided in the other end portion of the linking rod 74.

The connecting portion between the piston rod 19 of the second hydraulic damper 16 and the linking rod 74 includes a structure in which a male screw 19a on the piston rod 19 is threadably engaged with the female screw 74a of the linking rod 74, and fastened by a lock nut 48. The screw shaft 54 is screwed into the female screw 74b of the linking rod 74, and fixed by a lock nut 55.

The vibration damping device 71 according to this preferred embodiment is attached to a vehicle body 2 as disclosed in the above-described preferred embodiments. That is, as shown in FIG. 1, the vibration damping device 71 is attached to the vehicle body 2 so as to extend in the lateral direction of the vehicle body 2. The vibration damping device 71 may also be attached to the vehicle body 2 so as to extend in the longitudinal direction of the vehicle body 2 as shown in FIG. 9, or attached to the vehicle body 2 so as to extend obliquely to the vehicle body 2 as shown in FIG. 10.

In this preferred embodiment, the first, second, and third hydraulic dampers 15, 16, and 72 damp the vibration of the vehicle body 2. Accordingly, this preferred embodiment provides a vibration damping device having a vibration damping ability higher than that of the first and second vibration damping devices 11 and 12 including only the first and second hydraulic dampers 15 and 16.

The third hydraulic damper 72 according to this preferred embodiment preferably has the same damping performance as that of the first and second hydraulic dampers 15 and 16. Therefore, the vibration of the vehicle body 2 is damped almost evenly in the three portions. Note that if the damping performance of the third hydraulic damper 72 is relatively low, vibrations are damped by only the third hydraulic damper 72, so no sufficient damping is obtained. On the other hand, if the damping performance of the third hydraulic damper 72 is relatively high, vibrations are mainly damped by the first and second hydraulic dampers 15 and 16, so the damping amount does not increase very much. In this preferred embodiment, however, a large damping amount is obtained by efficiently using the three hydraulic dampers 15, 16, and 72.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vibration damping device for a vehicle body, the vibration damping device comprising:
   a first hydraulic damper including a first end portion attached to a first attachment position of a vehicle body; and
   a second hydraulic damper coupled to a second end portion of the first hydraulic damper via a linking member, a first end portion of the second hydraulic damper, which is opposite to a second end portion coupled to the linking member, attached to a second attachment position of the vehicle body; wherein
each of the first hydraulic damper and the second hydraulic damper includes:
a hydraulic cylinder including an oil chamber filled with oil;
a piston movably fitted in the hydraulic cylinder and that partitions the oil chamber into a first oil chamber and a second oil chamber;
a piston rod connected to the piston and projecting from one end portion of the hydraulic cylinder;
a free piston movably fitted in the hydraulic cylinder and that partitions the hydraulic cylinder into a gas chamber filled with a high-pressure gas and the oil chamber to pressurize the oil in the oil chamber;
a spring that cancels an axial-direction force acting on the piston rod due to a difference between pressure-receiving areas of two surfaces of the piston;
a working oil passage that allows the first oil chamber and the second oil chamber to communicate with each other; and
a throttle in the working oil passage;
the first hydraulic damper, the second hydraulic damper, and the linking member are aligned in a longitudinal direction of the vibration damping device;
one of the hydraulic cylinder and the piston rod of the first hydraulic damper is coupled to the linking member, and the other of the hydraulic cylinder and the piston rod of the first hydraulic damper is attached to the first attachment position;
one of the hydraulic cylinder and the piston rod of the second hydraulic damper is coupled to the linking member, and the other of the hydraulic cylinder and the piston rod of the second hydraulic damper is attached to the second attachment position;
the linking member includes a round metal rod having a thickness that is greater than a thickness of the piston rod of the first hydraulic damper and a thickness of the piston rod of the second hydraulic damper;
the round metal rod includes two flat surfaces on opposite circumferential sides of the round metal rod; and
a first lock nut fastens a connecting portion between the linking member and the one of the hydraulic cylinder and the piston rod of the first hydraulic damper, and a second lock nut fastens a connecting portion between the linking member and the one of the hydraulic cylinder and the piston rod of the second hydraulic damper.

2. The vibration damping device for a vehicle body according to claim 1, wherein
the piston rod of the first hydraulic damper and the piston rod of the second hydraulic damper are coupled to each other via the linking member;
the hydraulic cylinder of the first hydraulic damper is attached to the first attachment position; and
the hydraulic cylinder of the second hydraulic damper is attached to the second attachment position.

3. The vibration damping device for a vehicle body according to claim 1, wherein
the hydraulic cylinder of the first hydraulic damper and the hydraulic cylinder of the second hydraulic damper are coupled to each other via the linking member;
the piston rod of the first hydraulic damper is attached to the first attachment position; and
the piston rod of the second hydraulic damper is attached to the second attachment position.

4. The vibration damping device for a vehicle body according to claim 1, wherein the first hydraulic damper and the second hydraulic damper have a same damping performance.

5. The vibration damping device for a vehicle body according to claim 1, wherein
the first attachment position is located at a first end portion of the vehicle body in a lateral direction of the vehicle body; and
the second attachment position is located at a second end portion of the vehicle body in the lateral direction of the vehicle body.

6. The vibration damping device for a vehicle body according to claim 1, wherein
the first attachment position is located at a first end portion of the vehicle body in a longitudinal direction of the vehicle body; and
the second attachment position is located at a second end portion of the vehicle body in the longitudinal direction of the vehicle body.

7. The vibration damping device for a vehicle body according to claim 1, wherein the linking member includes a third hydraulic damper having a same structure as that of the first hydraulic damper and the second hydraulic damper.

8. The vibration damping device for a vehicle body according to claim 7, wherein the first hydraulic damper, the second hydraulic damper, and the third hydraulic damper have a same damping performance.

* * * * *